Feb. 11, 1958  B. WALKER  2,823,068
VEHICLE SPARE TIRE MOUNTING
Filed Oct. 5, 1954

INVENTOR.
Brooks Walker
BY

United States Patent Office 2,823,068
Patented Feb. 11, 1958

2,823,068
VEHICLE SPARE TIRE MOUNTING
Brooks Walker, Piedmont, Calif.

Application October 5, 1954, Serial No. 460,405

6 Claims. (Cl. 296—37.2)

This invention pertains to an improved method of mounting the spare tire or tire and wheel in a motor vehicle, and particularly in the type of vehicle in which there is a long extension of the body or fenders extending rearwardly from the rear wheels so that the spare tire may be nested substantially within the outer width of the car in a recess formed in these skirts or body portions of the vehicle rearwardly of one or more of the rear wheels.

Tires have been carried within the fenders rearwardly of the rear wheels, as is shown in my co-pending U. S. patent application, Ser. No. 314,265, entitled "Rear Fender Compartment," now Patent No. 2,773,719. However, the construction shown in Ser. No. 314,265 requires that the car be lifted on a jack in order to get the spare tire in and out of the well formed in back of the skirt which extends rearwardly from the rear wheel.

In this invention the spare tire is mounted in a recess formed in the exterior side of the extension of the body or fender rearwardly of the rear wheel so that the spare wheel or tire may be inserted directly into this recess and the tire is exposed to view in such a way as to add to the appearance of the vehicle.

A further object of the invention is to provide a partial cover for the spare tire, in which the ornamental side grill or trim encloses the spare tire and is locked in place to prevent theft of the spare tire and to add to the appearance of the vehicle.

A further object of the invention is to provide a recess in which the spare tire may be carried which will not extend the length of the car, keep the spare tire fairly close to the rear wheels so as to maintain substantially the same weight distribution as when the tire is carried within the luggage compartment, and still to provide access to the spare tire from the exterior of the vehicle without disturbing the luggage.

Another object of the invention is to utilize waste space in the vehicle rearwardly of the rear wheels below the frame of the car in which the spare tire can be carried and still be accessible from the exterior of the car.

Another object of the invention is to provide a space for the spare wheel or tire, accessible rearwardly at the rear wheels, and in which a cover encloses the spare tire enclosure and is secured in place so that it may not be removed by unauthorized persons.

Further objects of the invention will be more particularly pointed out in the accompanying specifications and claims.

In all figures like numerals of reference refer to corresponding parts.

Figure 1:
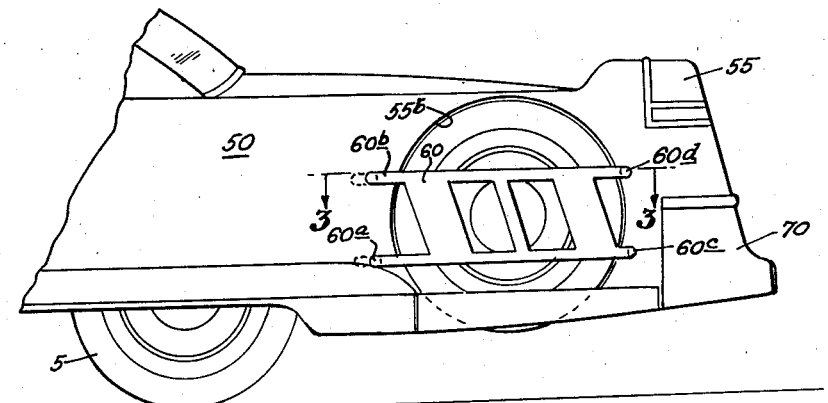
Fig. 1 is a side elevation of the rear portion of a vehicle incorporating one form of the invention.
Figure 2:
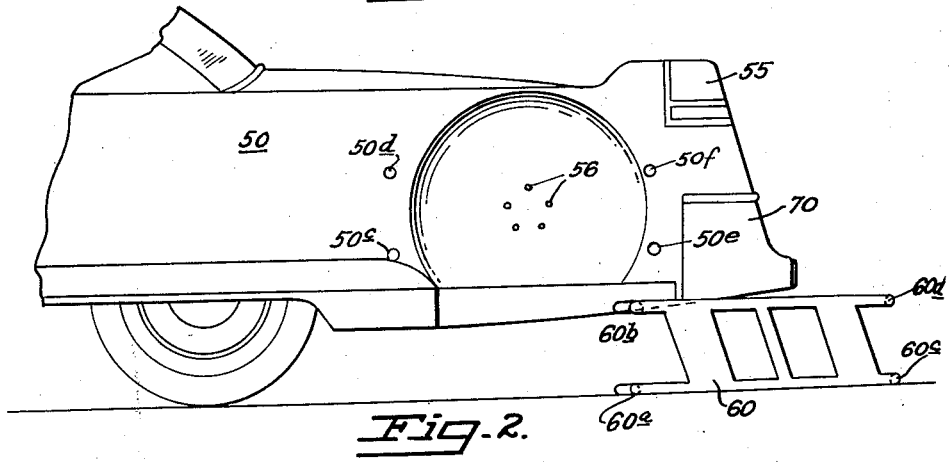
Fig. 2 is similar to Fig. 1 but showing the grill and spare wheel removed.
Figure 4:
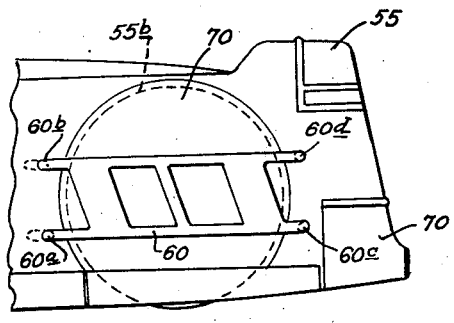
Fig. 4 is a side elevation of the rear portion of the vehicle showing another form of the invention.
Figure 3:
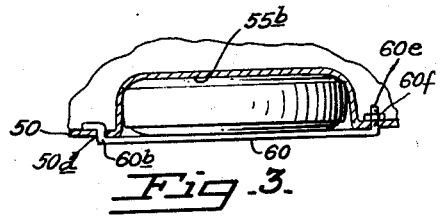
Fig. 3 is a cut away section at section 3—3 of Fig. 1 showing the spare tire unsectioned and showing only a small portion of the vehicle body around the spare tire.

In all figures numeral 50 designates the vehicle body which is supported on ground engaging wheels 5. Extensions of the body or fenders extend behind the rear wheels 5 to tail light 55 and bumper 70. Formed between the rear wheel and bumper 70 is a recess 55b adapted to receive the spare tire from the exterior of said vehicle, as shown in Fig. 3. The spare may be retained by a grill 60. The forward ends 60a and 60b enter holes 50c and 50d and the rear ends 60c and 60d are secured by studs 60e and nuts 60f. Nuts 60f preferably fit the tire winch by being similar to the nuts that hold the wheel 5 to the axle or the spare to the body on studs 56, as shown in Fig. 2. By having the grill removable from bolts or controls within the luggage compartment which conventionally has a lock, unauthorized personnel cannot remove the spare and no extra lock is necessary. In case it is not desirable to expose the spare for appearance's sake, as is done in Figs. 1, 2, and 3, a cover 70 similar to fender skirt is attached to the grill 60, as shown in Fig. 4. This cover 70 covers the spare and might be used without the grill by securing it to the body in a manner similar to a fender skirt or by controls from within the luggage compartment, similar to the controls used on the grill shown in Fig. 3.

From the foregoing it may be seen that I have provided a means of utilizing waste space behind the rear wheels of vehicles to store the spare wheel, to locate the spare where it is accessible without removing the luggage, or without raising the vehicle to remove the spare. This location makes attractive the appearance of the spare showing at the side of the vehicle and reduces the damage to rear fenders due to scratches as the spare is harder to damage than the fenders. The spare is secured against theft without the need of an extra lock by the lock on the conventional luggage door. The distribution of weight in the car is kept substantially the same as the spare is about the same distance back of the center of the car as when carried in the luggage compartment. The length of the car is the same while increasing the luggage space and getting the spare out of the luggage space.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In an automotive vehicle having ground-engaging rear wheels and a body having a generally vertical side wall including a front portion, an indented generally vertical portion and a rear extension portion extending back beyond said rear wheels with the side wall extension portion lying in substantially the same plane as said front portion, the combination therewith of a generally disc-shaped vertical recess defined by the indented generally vertical portion, said recess extending in from the outside of said side wall and means for holding a spare tire substantially within the recess and substantially flush with said side wall.

2. In combination with the vehicle of claim 1, a dust cover disc adapted to fit over said disc-shaped vertical recess after a spare tire has been inserted in said recess, and means for securing said disc to said side wall of the vehicle.

3. The vehicle of claim 1, wherein said means is operable from behind said side wall.

4. In the vehicle of claim 1, the structure wherein said means for holding a spare tire comprises a grille and means of fastening said grille to the side wall fore and aft of said recess.

5. The structure of claim 4 wherein said vehicle has a luggage compartment separated from said recess by said indented generally vertical portion and wherein said fastening means extend through said side wall and are locked in place and released from inside said luggage compartment.

6. The structure of claim 4 wherein said grille incorporates a dust cover disc that, when said grille is fastened in place, closes said recess substantially flush with said side wall.

References Cited in the file of this patent

UNITED STATES PATENTS

| | | |
|---|---|---|
| 1,289,871 | Mueller | Dec. 31, 1918 |
| 1,850,826 | Burney | Mar. 22, 1932 |
| 2,251,970 | Avery et al. | Aug. 12, 1941 |
| 2,700,572 | Torrance | Jan. 25, 1955 |

FOREIGN PATENTS

| | | |
|---|---|---|
| 1,064,655 | France | Dec. 30, 1953 |